June 21, 1960
J. W. McBRIDE
2,941,494
POWER PROPELLED WATER CRAFT
Filed Feb. 23, 1954
3 Sheets-Sheet 1
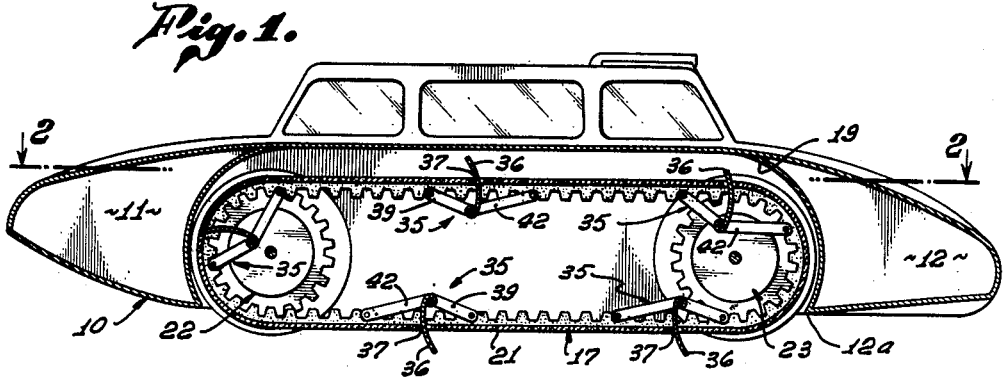
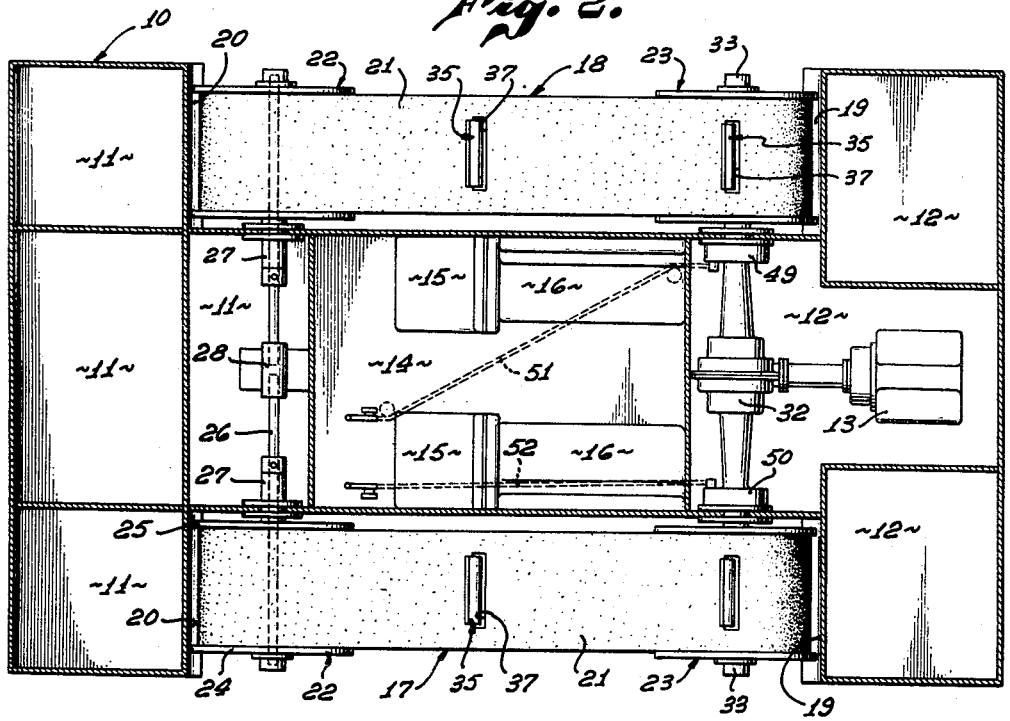
INVENTOR.
JOHN W. McBRIDE,
BY
Flam and Flam
ATTORNEYS.

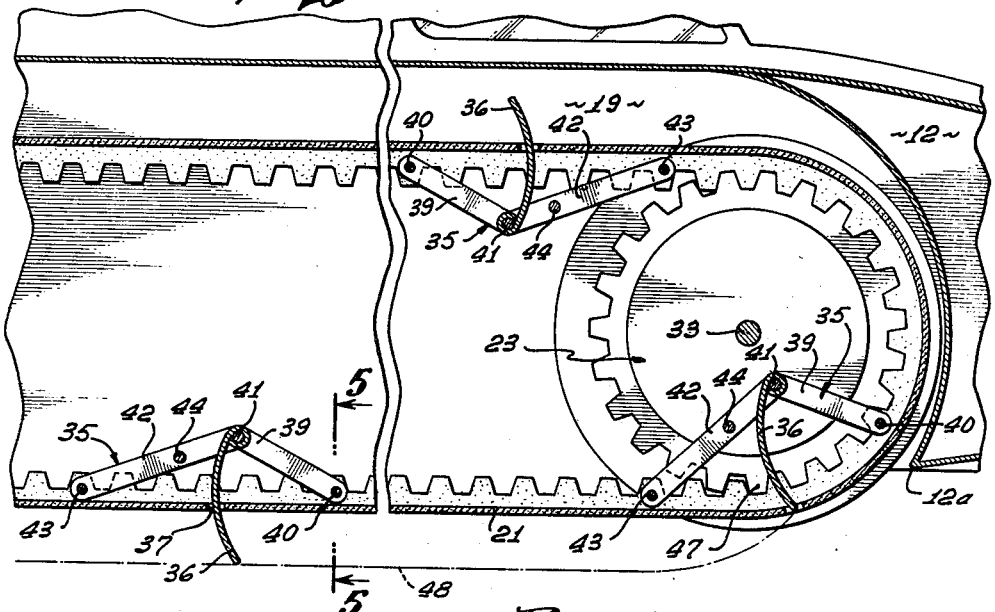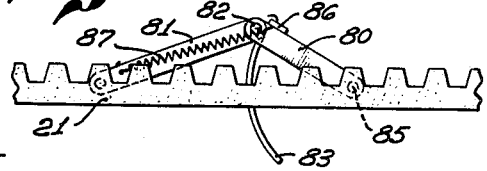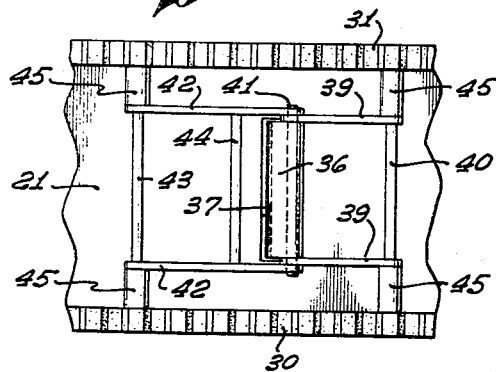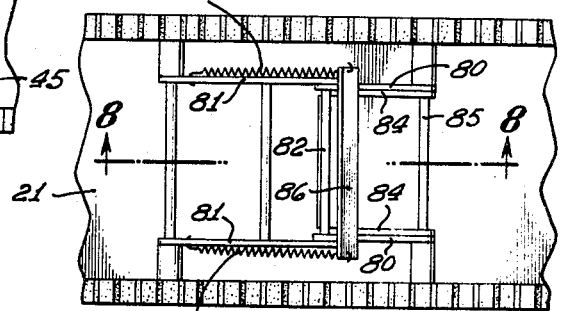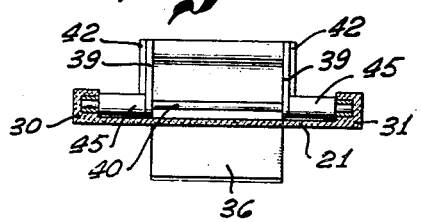

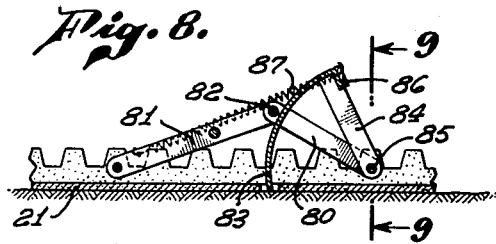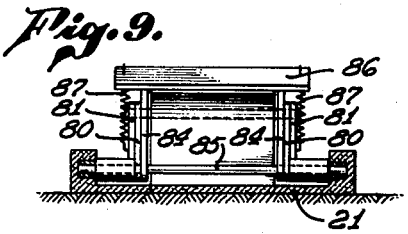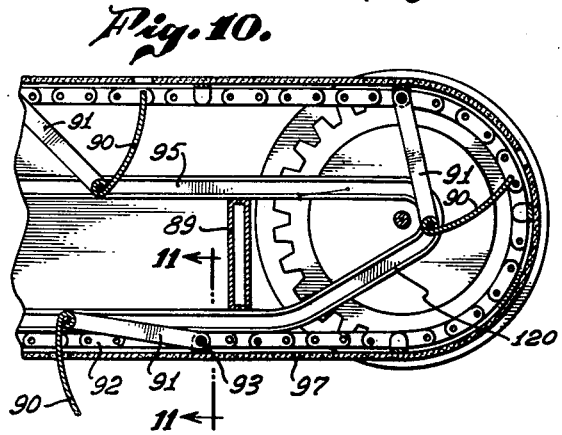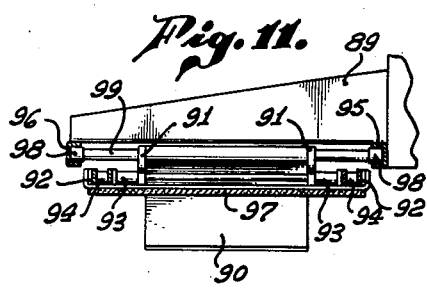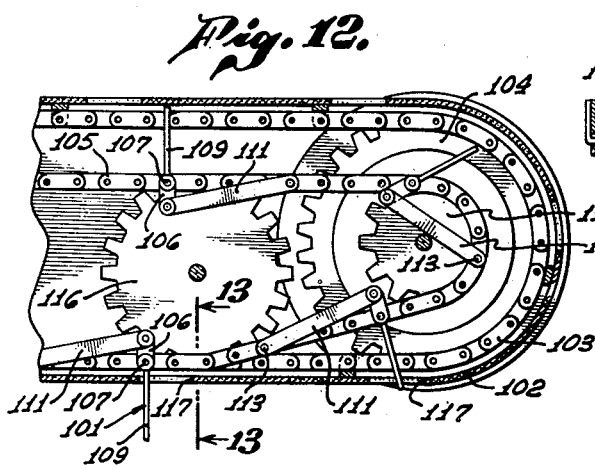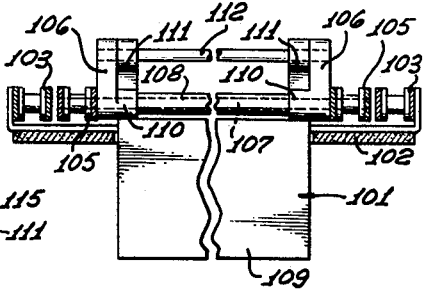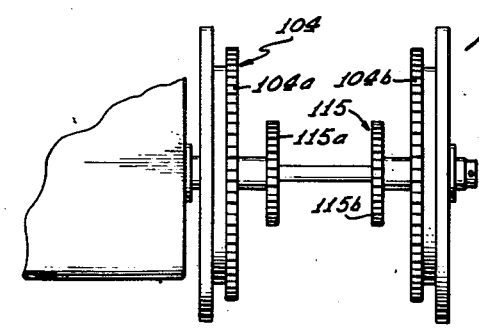

United States Patent Office 2,941,494
Patented June 21, 1960

2,941,494
POWER PROPELLED WATER CRAFT
John W. McBride, Burbank, Calif., assignor to Bantar, Incorporated, Burbank, Calif., a corporation of California Filed Feb. 23, 1954, Ser. No. 411,755
13 Claims. (Cl. 115—1)

This invention relates to water surface craft, and more particularly to a paddle mechanism for propelling the craft on the water.

Most water craft utilizing paddles or scoops are inefficient. Several factors contribute to low efficiency, such as substantial turbulence accompanying movement of the paddles into and out of the water; a small relative length of the operative path of the paddle increasing the proportionate loss in turbulence, and the angled path of the paddles with respect to the horizontal.

Some attempts to overcome these and other sources of inefficiency have been made. Complicated and delicate structures have resulted from these attempts. It is, accordingly, an object of this invention to provide a novel and improved propelling mechanism of this character that is extremely simple in structure, yet effective to eliminate principal sources of low efficiency.

By the aid of this invention, simple mechanical arrangements provide appropriate inserting and retracting movement of paddle elements. An endless flexible member, such as a belt, tracking upon the water supports or cooperates with the elements; the elements are retracted within the belt before that portion of the belt with which the element cooperates moves from the water, and likewise projected beyond the belt only after that portion is in contact with the water.

It is another object of this invention to provide a craft of this character that can operate upon the shore as well as on the water, and that can easily move from the shore to the surf and from the surf to the shore, all without changing the operative arrangement of the mechanism.

It is another object of this invention to provide a novel water craft that lays its own track upon the water, materially reducing viscous drag.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a longitudinal sectional view of a water surface craft embodying the present invention;

Fig. 2 is a sectional view of the apparatus shown in Fig. 1;

Fig. 3 is an enlarged fragmentary sectional view of a portion of the propelling mechanism shown in Fig. 1;

Fig. 4 is a fragmentary plan view of a propelling element shown in Fig. 3;

Fig. 5 is a sectional view, taken along the plane indicated by line 5—5 of Fig. 3;

Figs. 6 and 7 are side and plan views similar to Figs. 3 and 4, resepctively, and showing a modified form of this invention;

Fig. 8 is a fragmentary sectional view, taken along the plane indicated by line 8—8 of Fig. 7, and showing the propelling element in an alternate position;

Fig. 9 is a sectional view, taken along the plane indicated by line 9—9 of Fig. 8, and corresponding substantially to Fig. 5;

Fig. 10 is a fragmentary view similar to Fig. 3, showing another modified form of this invention;

Fig. 11 is a sectional view, taken along the plane indicated by line 11—11 of Fig. 10;

Fig. 12 is a view similar to Fig. 10, but showing yet another modified form of this invention;

Fig. 13 is a broken sectional view, taken along the plane indicated by line 13—13 of Fig. 12; and Fig. 14 is an end view of the mechanism shown in Fig. 12.

A water surface craft 10 (Figs. 1 and 2) may be made in any suitable form or shape to provide appropriate buoyancy when the craft is at rest in the water. In the present instance, the craft 10 is of lightweight frame construction, such as plywood or sheet metal.

Watertight compartments 11 and 12 are provided fore and aft. Some of these compartments may form fuel tanks for an engine 13 operating propelling mechanisms; others may be used for air to provide buoyancy.

A passenger compartment 14 centrally of the craft 10 has appropriate seats 15 and bunks 16.

A pair of propelling mechanisms 17 and 18 for the craft are disposed in elongate recesses 19 and 20 extending longitudinally thereof, and adjacent opposite edges of the craft. These recesses 19 and 20 are exposed on the underside of the craft.

Since the propelling mechanisms 17 and 18 are identical, only one of them will be described in detail.

An endless flexible belt 21 engages opposite outer elements of front and rear parallel sprocket wheel assemblies 22 and 23 (Fig. 3). These assemblies 22 and 23 are located at opposite ends of the recess 19. The sprocket wheel assembly 22, for instance, includes a pair of axially spaced sprocket wheel elements 24 and 25 both joined to a shaft 26. A sealed extension of the shaft 26 extends inwardly into one of the forward compartments 11, and is supported by bearing structures 27 and 28.

The sprocket wheel elements 24 and 25 have teeth that are respectively in interengagement with rack structures formed on inwardly extending flanges 30 and 31 at opposite lateral edges of the belt 21 (Fig. 4). The rear sprocket wheel assembly 23 is similar to the front sprocket wheel assembly 22, and is driven through a differential transmission mechanism 32 by the engine 13. A sealed extension of the shaft 33 mounting the rear sprocket wheel assembly 23 extends inwardly into one of the compartments 12 at the rear of the craft for cooperation with the transmission mechanism 32 therein.

A friction drive for the belt 21 could be provided in place of the positive drive. In this instance, a belt could directly engage the outer elements of spaced-apart members having cylindrical surfaces.

The sprocket wheel assemblies 23 and 22 support the belt 21 in such manner that spaced-apart runs are horizontally disposed one above the other, the runs extending longitudinally of the craft. The lower run extends slightly beneath the craft 10 and is directly exposed to the water.

A series of paddle units 35 is carried for movement on the flexible belt 21. Each paddle unit includes a paddle element 36 (in this instance curved) that in its operative position on the lower run extends transversely through a slit 37 in the belt 21. The paddle element 36, when operative, extends generally vertically, the portion of the element 36 beyond the belt projecting into the water.

These units 35 move relative to the craft 10 in a direction from one end of the craft 10 toward the other. The interaction between the paddles 36 and the water appropriately propels the craft in a direction corresponding to the direction of angular movement of the driving sprocket wheel assembly 23.

The under sides of the craft at opposite ends thereof are inclined to the surface of the water. Accordingly, upon movement of the craft in either longitudinal direction, reaction lifts the craft. When sufficient speed is attained, the water level substantially coincides with the lower run of the flexible belt 21. The belt 21 then forms a track upon the water, minimizing viscous drag otherwise retarding motion.

The paddle units 35 are suspended in a particular manner whereby turbulence is substantially eliminated at those portions of the cycle of movement of the units 35, during which the padlles 36 are inserted into and retracted from the water.

The construction is shown to best advantage in Figs. 3, 4 and 5. A triangular linkage structure is provided for supporting each paddle element 36. A pair of parallel links 39 (see, particularly, Figs. 3 and 4) are each pivotally mounted on a common axis provided by a shaft or pin 40. Opposite ends of the shaft 40 are accommodated in appropriate recesses in opposite surfaces of the flanges 30 and 31 of the belt 21 (see, also, Fig. 5). The other ends of the links 39 are each joined, as by welding, to a pin 41, the ends of the pin extending beyond the links 39. The links 39 are pivotally movable in unison.

Another pair of links 42 have corresponding ends pivotally mounted on a shaft or pin 43. This shaft 43 has its opposite ends accommodated in aligned recesses in opposing surfaces of the belt flanges 30 and 31 at a place spaced from the shaft or pin 40 mounting the other pair of links 39.

The links 39 and 42 are pivotally connected to form a triangular configuration. The ends of the links 42 are provided with circular recesses receiving the ends of the pin 41.

A strut 44 interconnects the pair of links 42, ensuring their movement in unison, and preventing inadvertent movement of the ends of the links 42 beyond the common pin 41.

Appropriate spacers 45 are provided for those ends of the pairs of links 39 and 42 that are mounted upon the shafts 40 and 43, respectively.

The arcuate paddle has one end bent around and joined to the interconnecting pin 41. The paddle element 36 is thus joined to the links 39 by the aid of the interconnecting pin 41. The paddle 36 extends between the pairs of links 39 and 42 from the apex formed at the pivotally interconnected ends thereof.

When the pins 40 and 43 mounting the pairs of links 39 and 42 extend along the straight portion of the belt 21, the length between the pins 40 and 43 is such that the height therefrom of the pin 41 mounting the paddle element 36 is small as compared with the length of the paddle element 36. The paddle element 36 accordingly extends beyond this line. Since the belt 21 extends substantially at the level of the pins 40 and 43, the paddle element 36 also projects beyond the slit 37 of the belt 21 into operative position.

Assuming counterclockwise rotation of the driving sprocket wheel assembly 23, the paddle units 35 are moved from the lower operative run of the belt 21 to the upper inoperative run of the belt 21 when carried around the sprocket wheel assembly 23. The shaft 40, mounting the forward links 39, upon arrival at a point 47 (Fig. 3) in its cycle of movement around the wheel assemblies, begins to travel an arcuate path about the axis of driving sprocket wheel assembly 23. The shaft 43, mounting the rear links 42 on the belt 21, continues to travel a rectilinear path until it arrives at the same point 47. The length between the pins 40 and 43 mounting the triangular links 39 and 42 accordingly shortens continuously until the shaft 43 arrives at the point 47. Until the shaft 43 arrives at the point 47, the pairs of links 39 and 42 fold toward each other. The distance of the pin 41 mounting the paddle element from the base defined by a line joining the pins 40 and 43 accordingly increases. Also, the belt 21 between the links 40 and 43 is curved outwardly to extend beyond the line joining the pins 40 and 43. The outward curvature of the belt 21 together with the increased altitude of the triangular linkage serves to move the terminal portion of the paddle element 36 relatively inwardly of the belt 21.

After the pin 43 arrives at the point 47, the angular spacing between the pins 40 and 43 remains constant and at a minimum distance corresponding to the cord of the arc separating the pins. The pin 41 interconnecting the links 39 and 42 is then positioned close to the shaft 33 of the sprocket assembly 23.

The curvature of the sprocket assembly 23 is sufficient with respect to the lengths of the links and the paddle element itself such that the paddle element 36 is fully retracted within the belt 21 before the belt 21 moves from the surface of the water. The terminal portion of the paddle element 36 along the lower run follows a path generally designated by the dotted line 48. The paddle element 36 does not break the water beyond the straight portion of the belt 21, and turbulence and friction are substantially eliminated. The lower edge 12a of the wall 12 acts to scoop the water from the belt 21 as it passes upwardly about the sprocket 23.

The curvature of the paddle element 36 is such that for all angular positions of the pairs of links 39 and the pin 41 mounted thereon, the paddle element 36 passes with clearance between the edges of the narrow slit 37 in the belt 21.

In the present instance, in order to maintain the size of the sprocket wheel assembly 23 small in comparison with the size of the paddle units 35 and the paddle elements 36, and yet permit the particular movement of the links 39 and 42, one of the pairs of links 39 is of shorter length than the other. Accordingly, the inwardmost portion of the links 39 and 42 passes eccentrically of the shaft 33 mounting the driving sprocket wheel assembly. The links 39 and 42 may be of equal length if clearance is provided about the sprocket wheel shaft 33.

The paddle elements 36 are inserted beneath the surface of the water in a manner substantially analogous to that in which they are retracted therefrom. Thus the paddle element 36 projects beyond the belt 21 only after the belt 21 is in operative position upon the water.

The course of the craft 10 may readily be controlled by varying the relative speed of the mechanisms 17 and 18 on opposite sides of the craft 10. Brake structures 49 and 50 are respectively associated with the shafts of the respective driving sprocket assemblies for the propelling mechansms 17 and 18. By varying the relative degrees of braking, the craft may be steered either right or left. The differential transmission 32 permits such control to be achieved while using but a single source of power 13. Appropriate control lines 51 and 52 terminate adjacent one of the seats 15 in the passenger compartment 14. Other controls for the speed of the motor and the like may be provided.

The craft 10 may readily be launched or beached, and can travel upon sand or similar terrain. The belt 21 may serve to provide appropriate traction on the sand, and the paddles 36 may slightly dig into the sand to enhance the traction.

In the form shown in Figs 6, 7 and 8, pairs of links 80 and 81 are provided, as before, that are pivotally connected to each other by the aid of a pin 82. Appropriate retracting and inserting movement of the paddles 83 is accomplished as in the previous form.

In the present instance, the paddles 83 are so mounted on the links 80 and 81 that they may be automatically retracted against a resilient force when the craft is propelled on the shore. Rocks or difficult terrain may otherwise render it inadvisable for the paddles 83 to project beyond the belt. The paddle unit 83 is mounted on a pair of links 84 disposed between the links 80 of the triangular frame. These links 84 are pivotally mounted on a shaft 85 which mounts the links 80.

A bar 86 interconnects the angularly movable ends of the paddle mounting links 84 and serves as a means of attachment for the paddle 83. This bar 86 has ends extending beyond the triangular links 80. Angular movement of the links 84 mounting the paddle unit 83 relative to the triangular links 80 is limited by engagement of the ends of the bar 86 with the edges of the triangular link members 80.

A pair of tension springs 97 serve normally to maintain the paddle unit 83 and its links 84 in this limited position for operation as in the previous form. One end of each tension spring 87 is secured to the other pair of triangular link members 81. The other end of each tension spring 87 engages the ends of the bar 86.

The yielding mounting of the paddles permits retraction of the paddles if they engage relatively unyielding terrain. Smooth operation of the craft on rugged terrain is ensured.

Figs. 8 and 9 show the paddle unit 83 retracted against the force of the tension springs 87, due to contact of the belt 21 with the ground.

In the form of the invention shown in Figs. 10 and 11, a sightly different arrangement is provided for ensuring appropriate inward and outward movement of the paddle units 90. The paddle units 90 are carried at angularly movable ends of a pair of parallel links 91. These links 91 are connected to an endless flexible element 92 for pivotal movement about a common substantially horizontal axis extending normal to the direction of movement of the flexible element. In this instance, the endless flexible element is a sprocket chain. A shaft 93, connected to a unit 94 of the sprocket chain structure 92, mounts the links 91.

A pair of parallel continuous tracks 95 and 96, supported on frame members 89, are provided for determining the position of the paddle units 90 with respect to a belt 97 supported upon the chain structure. These tracks 95 and 96 are generally of channel-shaped configuration and are opposed to each other. Guide members 98, formed at opposite ends of a pin 99 interconnecting the trailing and arcuately movable ends of the linkage 91, cooperate respectively with the tracks 95 and 96. The tracks 95 and 96 are situated close to the chain structure 92 during the lower operative run of the paddle units 90. Accordingly, during the lower run, the paddle units 90 are situated for operation in the water.

Toward the end of the lower horizontal operative run, the tracks 95 and 96 are spaced inwardly from the chain structure 92 and belt 97 in continuously increased amounts, as indicated at the portion 120. Accordingly, the paddles 90 are retracted within the belt 97 at the end of the operative lower run to eliminate turbulence.

As shown in Fig. 10, that portion of the tracks 95 and 96 paralleling the upper inoperative run is spaced substantially beneath the chain structure 92. The paddle units 90 are thus in a retracted position during the inoperative upper run thereof in order to provide a compact arrangement.

The paddle units 90 are inserted into the water by appropriately decreased spacing of the tracks 95 and 96 from the chain 92 and belt 97 about the front driving sprocket wheel elements.

In the form shown in Figs. 12, 13 and 14, a somewhat different arrangement is provided for achieving appropriate movement of paddle units 101.

An endless flexible belt 102 is carried on a pair of parallel sprocket chains 103, as in the form shown in Figs. 10 and 11. Front and rear driving sprocket wheel assemblies 104, each comprising a pair of coaxial sprocket wheels 104a, 104b, cooperate with the sprocket chains 103. The paddle units 101 are mounted upon a pair of auxiliary sprocket chains 105 that follow a path generally similar to the other sprocket chains. The pair of auxiliary sprocket chains 105 are disposed between the other sprocket chains. The sprocket chains 105 mounting the paddle units 101 are movable independently of, but in synchronism with, the sprocket chains 103 mounting the belt 102.

A pair of short links 106 are pivotally mounted upon a shaft 107. The shaft 107 has its ends carried in correspondingly situated chain elements of the respective auxiliary sprocket chains 105. A spacer 108 between the links 106 serves axially to locate them. A paddle element 109 is secured to hubs 110 integrally formed on the links 106. Another pair of links 111 are pivotally jointed to the movable ends of the links 106 as by the aid of a pin 112. The other ends of the links 111 are carried by the chains 105 at places spaced from the paddle element 109. Pins 113, extending between correspondingly situated elements of the chains 105, pivotally connect the ends of the links 111 to the chains 105.

Front and rear sprocket wheel assemblies 115, each comprising a pair of coaxial sprocket wheels 115a, 115b, engage the auxiliary sprocket chains 105. A definite path of movement of the auxiliary sprocket chains 105 with respect to the sprocket chains 103 mounting the belt 102 is provided. For this purpose, a pair of spaced idler sprocket wheel assemblies 116 (Fig. 12) spread the runs of the auxiliary chains 105 so that its lower run substantially coincides with the lower run of the outer chains 103. Each idler sprocket wheel assembly includes a pair of coaxial sprocket wheels for each of the pair of chains 105 respectively. Opposite elements of each sprocket wheel are engaged by the upper and lower runs of one of the auxiliary chains 105. The idler sprocket wheel assemblies 116 are so located that that portion of the auxiliary sprocket chains 105 between the idler sprocket assemblies on the lower run falls along the level of the sprocket chains 103 mounting the belt 102.

Paddle units 101 when in this portion of the path of continuous travel are in fully operative position. The paddle elements 109 project through wide slots 117 in the belt 102.

The sprocket assemblies 115 for operating the auxiliary conveyor chains 105 have a reduced diameter so that when the auxiliary chains 105 engage the outer elements thereof, the chains 105 are spaced from the sprocket chain 103 mounting the belt 102 in an amount sufficient to retract the paddle elements 109. Between the idler sprocket assemblies 116 and the driving sprocket assemblies 115, the distance of the auxiliary sprocket chains 105 from the sprocket chains 103 gradually increases. Retraction of the paddle elements 109 is thus accomplished near the end of the lower run. Insertion of the paddle elements 109 into the water is accomplished in a similar manner.

The path of movement of the terminal portion of the paddle elements 109 corresponds substantially to that provided in the previous forms. The paddle element 109 is completely retracted within the belt 102 before breaking the water beyond the belt 102. Insertion of the paddle elements 109 is similarly accomplished, and turbulence is largely eliminated.

When the pins 107 and 113, cooperating with the ends of the short link 106 and the brace 111, pass about the outer elements of the sprocket wheel assemblies 115, the length between these pins 107 and 113 shortens. The pivotal connection between the links 106, and 111 permits the links to fold toward each other and pass about the sprocket wheels as in the forms shown in Figs. 1 to 9.

The spacing of the upper run of the auxiliary conveyor chain 105 from the upper run of the conveyor chain 103 mounting the belt 102 is uniform and corresponds to that required fully to keep the paddle elements 109 in a retracted position. Accordingly, a compact arrangement is achieved.

In order to ensure proper cooperation of the paddle elements 109 with the slots 117 of the belt 102, a synchronous relationship is maintained between the driving sprocket assemblies 115 and 104. Specifically, the linear speed of the sprocket chains 105 corresponds to the linear speed of the sprocket chains 103. Also, to ensure proper registry of the paddle elements 109 with the slots 117, the lengths of the paths of the respective sprocket chains are related as small whole numbers to each other, like multiples of which correspond to the number of slots and the number of paddle units respectively.

An appropriate gear mechanism (not shown) may be provided that has two take-offs, the relative speeds of which are constant and in inverse ratio to the diameters of the driving sprocket assemblies for the respective pairs of chains. The gear mechanism ensures identical linear speed of the two sprocket chains.

The inventor claims:

1. In a vehicle propulsion mechanism: an endless flexible element having a surface forming an endless track; wheels over which the element passes; means for imparting longitudinal motion to the element and rotation to the wheels; a plurality of propelling means spaced along the element; there being apertures in the element for the protrusion of the propelling means; and means carried by the element for supporting said propelling means, including a link structure for fully retracting the propelling means by way of said openings, inwardly with respect to one of the wheels and inwardly of the element as the element progresses around the wheel, and for projecting the propelling means outwardly of the element as the element progresses between the wheels.

2. In a vehicle propulsion mechanism: an endless flexible element having a surface forming an endless track; wheels over which the element passes; means for imparting longitudinal motion to the element and rotation to the wheels; a plurality of propelling means spaced along the element; there being apertures in the element for the protrusion of the propelling means; and a link system carried by the element and on the inner side thereof, for supporting said propelling means, said system having pivot points spaced from each other to retract the propelling means by way of said openings, inwardly with respect to one of the wheels and with respect to the element as the element progresses around the wheel, said pivot points projecting the propelling means outwardly with respect to the element as the element progresses between the wheels.

3. In a vehicle propulsion mechanism: an endless flexible element having a surface forming an endless track; wheels over which the element passes; means for imparting longitudinal motion to the element and rotation to the wheels; a plurality of propelling means spaced along the element; there being apertures in the element for the protrusion of the propelling means; means carried by the element for supporting said propelling means; and means for fully retracting the propelling means by way of said openings, inwardly with respect to one of the wheel and with respect to the element as the element progresses around the wheel, and for projecting the propelling means outwardly of the element as the element progresses between the wheels.

4. In apparatus for propelling a vehicle: a pair of spaced wheels; a longitudinally movable flexible belt having a surface forming an endless track and engaging elements of said wheels; said flexible means having a run extending between the wheels; a paddle element movable along with the belt and mounted thereon; said belt having an aperture through which said paddle element extends; and means for projecting the paddle element through the aperture and into operative position with respect to said belt when said belt moves from engagement with one of said wheels at the start of said run and for retracting said paddle element within the aperture and from operative position with respect to said belt when said belt moves into engagement with the other of said wheels at the end of said run.

5. In apparatus for propelling a vehicle: a pair of wheels; a longitudinally movable flexible belt having a surface forming an endless track and engaging elements of said wheels; said flexible means having a run extending between the wheels; a link; means carried by the belt and forming a pivotal support for the link movable with said belt; said belt having an aperture; a paddle element carried for movement by the link; and means for moving the link to project the paddle element through the aperture and into operative position when said belt moves from engagement with one of said wheels at the start of said run and to retract said paddle element within the aperture and from operative position when said belt moves into engagement with the other of said wheels at the end of said run.

6. In apparatus of the character described: an endless flexible member; a pair of rotary members supporting said flexible member for longitudinal movement, a pair of links having ends pivotally connected together and having other ends respectively pivoted to said flexible element about axes spaced along the flexible member that are substantially parallel to the axes of the rotary members; a support; means mounting the support on one of the links for movement in a path fixed with respect to said one link; said path extending transverse to said one link; a paddle element carried by said support and extending in the direction of said path; means limiting relative movement of said support in one direction along said path; the paddle element extending between the links when the support is at its limited position; and yielding means resiliently urging said support to its limited position with respect to said one link.

7. In apparatus for propelling a vehicle: an endless flexible belt; spaced rotary members supporting said belt for longitudinal movement; said belt being arcuately movable about said rotary members; said belt having a transversely extending aperture; a first link movable with the belt and pivotally mounted at one end on the belt for angular movement about a first axis substantially parallel to the axes of the rotary members, and on one side of said aperture; a second link movable with the belt and pivotally mounted thereon at one end for angular movement about an axis substantially parallel to the axes of the rotary members, and on the other side of said aperture; means pivotally connecting the other ends of the links together; an arm angularly movable about an axis fixed with respect to one of said links and substantially parallel to the axes of said rotary members; a paddle element carried by said arm, and adapted to project through said belt aperture; means carried by said one link for limiting angular movement of the arm with respect to said one link, and defining a position of said paddle element in which said paddle element projects between the links; and yielding means resiliently urging said supplemental link to its limited position with respect to said one link.

8. In apparatus for propelling a vehicle: an endless flexible belt having a surface forming an endless track; a pair of rotary members within the belt and supporting the belt for longitudinal movement; said belt being arcuately movable about said rotary members; an arm; means pivotally supporting the arm on the belt; a paddle element carried by the arm; said belt having an aperture through which said paddle element may project; a guide member carried by the arm; and a track cooperating with said guide member for determining the distance of the free end of the arm from the belt, said track being spaced from said belt in an amount sufficient to retract said element within the belt when said aperture arrives at one of said rotary members and to project said element beyond the belt when said aperture moves from the other of said rotary members.

9. In apparatus for propelling a vehicle; a pair of parallel spaced rotary members; an endless flexible belt mounted by said rotary members for longitudinal movement, said belt being arcuately movable about the rotary members; said belt having a surface forming an endless track; an arm pivotally mounted on the belt for angular movement toward and away from the belt, the axis of pivotal mounting being transverse to the direction of movement of the belt; said belt having an aperture; a paddle element carried by the arm and movable transversely of the belt through the aperture upon angular movement of the arm about said axis; and guide means cooperable with the arm to determine the spacing of its free end from the belt, said guide means comprising a track, and a guide member carried by said arm in engagement with the track; the spacing of the track from the belt being increased at the rotary members to project said element beyond the belt and to retract said element from the belt at the rotary members respectively.

10. A water craft, comprising: a buoyant body; a pair of spaced wheels carried by the body; an endless apertured flexible element having a surface forming a track supported by the wheels, and having a lower run extending beneath the body; paddle elements mounted upon and movable along with the flexible element; means for projecting the paddle elements through corresponding apertures and into operative position at the start of said lower run and for retracting said paddle elements within the apertures and from operative position at the end of said lower run; and means for driving both the elements.

11. A water craft, comprising: a buoyant body; a pair of wheels spaced along the length of the body and carried by the body, said wheels being rotatable about substantially parallel axes transverse to the body; an endless flexible element providing a surface forming a track supported by the wheels, said element having a lower run extending beneath the body; paddle elements connected to the flexible element and movable along with the flexible element and projecting beneath the lower run of said flexible element; said flexible element having apertures through which the paddle elements may extend; means for driving the wheels for moving both the paddle elements and the lower run of said flexible element in the same direction toward one of said wheels; and means for retracting each paddle element within the flexible element as it arrives at the said one wheel; said body having means providing an edge located close to the flexible element at said one wheel for scooping water from the flexible element.

12. A water craft, comprising: a buoyant body; a pair of wheels spaced along the length of the body and carried by the body, said wheels being rotatable about substantially parallel axes transverse to the body; an endless flexible element providing a surface forming a track supported by the wheels, said element having a lower run extending beneath the body; said flexible element having a plurality of spaced apertures each extending across the flexible element; paddle elements connected to the flexible element and movable along with the flexible element and projecting with slight clearance through the apertures at the lower run of said flexible element; means for driving the wheels for moving both the paddle elements and the lower run of said flexible element in the same direction toward one of said wheels; and means for retracting each paddle element within the flexible element as it arrives at the said one wheel; said body having means providing an edge located close to the flexible element at said one wheel for scooping water from the flexible element.

13. A water craft, comprising: a buoyant body; a pair of wheels spaced along the length of the body and carried by the body, said wheels being rotatable about substantially parallel axes transverse to the body; an endless flexible element providing a surface forming a track supported by the wheels, said element having a lower run extending beneath the body; said flexible element having a plurality of spaced apertures each extending across the flexible element; paddle elements connected to the flexible element and movable along with the flexible element and projecting with slight clearance through the apertures at the lower run of said flexible element; means for driving the wheels for moving both the paddle elements and the lower run of said flexible element in the same direction toward one of said wheels; and means for retracting each paddle element within the flexible element as it arrives at the said one wheel.

References Cited in the file of this patent

UNITED STATES PATENTS

| | | |
|---|---|---|
| 397,718 | Hawkins | Feb. 12, 1889 |
| 440,234 | Schaffers | Nov. 11, 1890 |
| 921,823 | Gays | May 18, 1909 |
| 1,516,270 | Edmunds et al. | Nov. 18, 1924 |
| 1,788,440 | Prell | Jan. 13, 1931 |
| 2,404,493 | Hait et al. | July 23, 1946 |

FOREIGN PATENTS

| | | |
|---|---|---|
| 809,942 | France | Dec. 19, 1936 |